US008600017B2

(12) United States Patent
Lee

(10) Patent No.: US 8,600,017 B2
(45) Date of Patent: Dec. 3, 2013

(54) CALL SETUP METHOD AND TERMINAL IN AN IP NETWORK

(75) Inventor: Dae-Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1367 days.

(21) Appl. No.: 11/907,943

(22) Filed: Oct. 18, 2007

(65) Prior Publication Data

US 2008/0144785 A1    Jun. 19, 2008

(30) Foreign Application Priority Data

Dec. 19, 2006  (KR) .......................... 10-2006-0130188

(51) Int. Cl.
*H04M 11/00*    (2006.01)

(52) U.S. Cl.
USPC ..................................... 379/88.17; 379/88.22

(58) Field of Classification Search
USPC ......... 370/401, 352, 338, 469, 219, 389, 328, 370/356, 392; 709/223, 227, 249; 348/751; 379/1.02; 455/411
See application file for complete search history.

(56) References Cited

U.S. PATENT DOCUMENTS

| 6,091,945 | A * | 7/2000 | Oka .............................. 455/411 |
| 6,731,630 | B1 * | 5/2004 | Schuster et al. ............. 370/356 |
| 7,194,068 | B2 * | 3/2007 | Page ............................. 379/1.02 |
| 7,577,090 | B2 * | 8/2009 | Xu et al. ....................... 370/219 |
| 7,596,116 | B2 * | 9/2009 | Harris et al. .................. 370/328 |
| 2001/0043614 | A1 * | 11/2001 | Viswanadham et al. ...... 370/469 |
| 2002/0009081 | A1 * | 1/2002 | Sampath et al. .............. 370/389 |
| 2002/0165969 | A1 * | 11/2002 | Gallant ........................ 709/227 |
| 2003/0165145 | A1 * | 9/2003 | Cho .............................. 370/401 |
| 2003/0200298 | A1 * | 10/2003 | Su et al. ....................... 709/223 |
| 2004/0008666 | A1 * | 1/2004 | Hardjono ...................... 370/352 |
| 2005/0073982 | A1 * | 4/2005 | Corneille et al. ............. 370/338 |
| 2005/0080931 | A1 * | 4/2005 | Hardy et al. .................. 709/249 |
| 2005/0117605 | A1 * | 6/2005 | Yan et al. ...................... 370/469 |
| 2006/0268183 | A1 * | 11/2006 | Dunko et al. ................. 348/751 |
| 2007/0019631 | A1 * | 1/2007 | Jang ............................. 370/352 |
| 2007/0253418 | A1 * | 11/2007 | Shiri et al. .................... 370/392 |

FOREIGN PATENT DOCUMENTS

| EP | 1143667 | 10/2001 |
| EP | 1 646 211 | 4/2006 |
| JP | 2003-122710 | 4/2003 |

(Continued)

OTHER PUBLICATIONS

UK Combined Search and Examination Report issued on Jan. 14, 2008, corresponding to UK Patent Application No. 0720968.7.

(Continued)

*Primary Examiner* — Asad Nawaz
*Assistant Examiner* — Parth Patel
(74) *Attorney, Agent, or Firm* — H.C. Park & Associates, PLC

(57) ABSTRACT

A call setup method and terminal in an IP network, in which in response to a request for an outbound call from a first terminal, it is identified whether or not an index matching an identification of a second terminal exists in a matching table. The identification of the second terminal is inputted at the request for the outbound call. If the index matching the identification of the second terminal exists in the matching table, a call initialization message is directly transmitted to the second terminal. In response to call setup, a call state synchronization message is transmitted to a call manager.

20 Claims, 3 Drawing Sheets

(56) References Cited

FOREIGN PATENT DOCUMENTS

| | | |
|---|---|---|
| KR | 2001-0054814 | 7/2001 |
| KR | 10-2002-0048173 | 6/2002 |
| KR | 10-2004-0110032 | 12/2004 |
| KR | 10-2006-0095244 | 8/2006 |
| WO | WO 01/58101 | 8/2001 |
| WO | WO 02/075572 | 9/2002 |
| WO | WO 2006/036206 | 4/2006 |
| WO | WO 2007/125530 | 11/2007 |

OTHER PUBLICATIONS

Korean Office Action issued on Jan. 30, 2008, corresponding to Korean Patent Application No. 2006-0130188.

*Decision of Grant* from the Korean Patent Office issued in Applicant's corresponding Korean Patent Application No. 20060-0130188 dated May 28, 2008.

\* cited by examiner

CALL SETUP METHOD AND TERMINAL IN AN IP NETWORK

CLAIM OF PRIORITY

This application makes reference to, incorporates the same herein, and claims all benefits accruing under 35 U.S.C. §119 from an application for CALL SETUP METHOD AND TERMINAL IN INTERNET PROTOCOL NETWORK earlier filed in the Korean Intellectual Property Office on 19 Dec. 2006 and there duly assigned Serial No. 10-2006-0130188.

BACKGROUND OF THE INVENTION

1. Field of the Invention

The present invention relates to a call setup method in an Internet Protocol (IP) network and a terminal using the same method.

2. Description of the Related Art

VoIP (Voice over Internet Protocol) means an Internet telecommunication technology in use for devices that transfer voice information via discrete Internet Protocol (IP) packets. Rather than using traditional circuit-committed protocols such as Public Switched Telephone Network (PSTN), VoIP is used to transfer digitalized voice information in discontinuous packets. VoIP uses the real-time protocol (RTP) to help ensure that packets get delivered in a timely manner.

In general, when a new Uniform Resource Locator (URL) is inputted during Internet surfing, a Personal Computer (PC) sends a query message to a Domain Name Service (DNS) server. However, in the case of continuous Internet access to the same URL, previously-received information is first cached in a DNS local table, and matching information is used. That is, the DNS query message is not transmitted.

It is the same for the Address Resolution Protocol (ARP). If an ARP table is stored, in the event of constructing an Ethernet frame for a corresponding IP terminal, Media Access Control (MAC) address information is used on the basis of information existing in the terminal.

On the contrary, various approaches have been considered to reduce call setup time in a Voice over Internet Protocol (VoIP) terminal.

That is, various methods have been sought to quickly search the IP address of a destination terminal on the basis of destination terminal identification (ID) expressed in an initialization message when a call-translating, outbound call manager or outbound proxy server transmits the initiation message at the time of call setup. However, no advanced schemes have been considered for the terminal.

In other words, conventional methods have been focused to find a mapping destination IP address on the basis of network environment and destination ID, but these factors have not been considered for the terminal.

Accordingly, in the case of call setup between IP terminals that interwork with an IP Centrex, conventional schemes of translating addresses through the outbound call manager (or outbound proxy server) encounter gradually increasing load of the outbound call manager without reduction in call setup time.

SUMMARY OF THE INVENTION

It is an object of the present invention to provide a call setup method and terminal in an IP network, which can reduce call setup time as well as lighten the load of an outbound call manager in the case of call setup between IP terminals that inter-work with an IP Centrex.

According to an aspect of the present invention, the call setup method in an IP network of the present invention includes steps of: identifying, in response to a request for an outbound call from a first terminal, whether or not an index matching an identification of a second terminal exists in a matching table, wherein the identification of the second terminal is inputted at the request for the outbound call; if the index matching the identification of the second terminal exists in the matching table, directly transmitting a call initialization message to the second terminal; and transmitting, in response to call setup, a call state synchronization message to a call manager.

Preferably, the call setup method further includes steps of: if it is identified, in the identifying step, that the index matching the identification of the second terminal does not exist in the matching table, transmitting the call initialization message to the call manager; and adding, in response to call setup, a related index to the matching table and processing the requested outbound call.

Preferably, the transmitting step transmits the call state synchronization message to the call manager using a notify method.

Preferably, the related index added to the matching table includes counterpart identification information and final contact information.

According to another aspect of the present invention, the call setup method in an IP network of the present invention includes steps of: identifying, in response to a request from a first terminal for an inbound call of a second terminal, whether or not an index matching an input identification exists in a matching table; if the index matching the identification of the second terminal exists in the matching table, updating an aging time of the matching table; and after the aging time is updated, processing the requested inbound call.

Preferably, the call setup method further includes a step of deleting a related index from the matching table, if it is identified, in the identifying step, that there is a change in an IP mapping to the identification of the second terminal.

According to another aspect of the present invention, the call setup terminal in an IP network of the present invention includes a controller, wherein the controller is configured to: if an index matching an identification of the destination terminal, which is inputted at an outbound call request, exists in a matching table, directly transmit a call initialization message to a destination terminal; transmit a call state synchronization message to a call manager in response to call setup; and if an index matching an identification, which is inputted at an inbound call request, exists in the matching table, update an aging time of the matching table.

Preferably, the controller transmits, if the index matching the identification of the destination terminal does not exist in the matching table, the call initialization message to the call manager, and adds a related index to the matching table in response to call setup.

In particular, the controller transmits the call state synchronization message using a notify method. Preferably, the related index added to the matching table includes counterpart identification information and final contact information.

Preferably, the controller deletes, if there is a change in an IP mapping to the identification of the destination terminal, a related index from the matching table.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Figure 1:
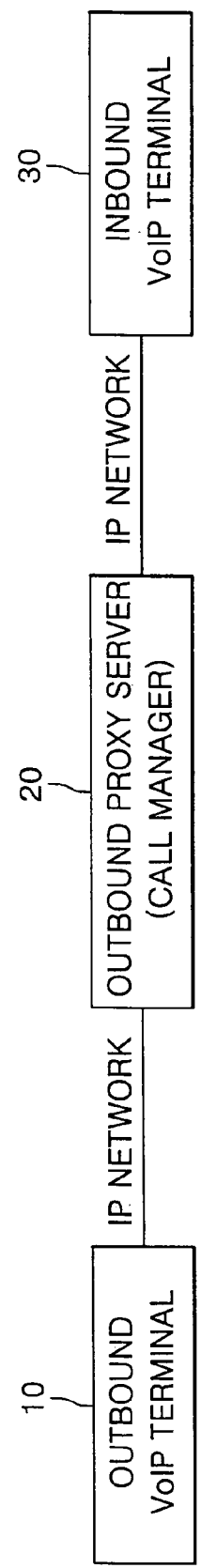
FIG. 1 is a schematic diagram illustrating a call setup system in an IP network according to the present invention.

The present invention will now be described more fully hereinafter with reference to the accompanying drawings, in which preferred embodiments thereof are shown. Reference now should be made to the drawings, in which the same reference numerals and signs are used throughout the different drawings to designate the same or similar components. In the following description of the present invention, a detailed description of known functions and components incorporated herein will be omitted when it may make the subject matter of the present invention rather unclear.

FIG. 1 is a schematic diagram illustrating a call setup system in an IP network according to the present invention.

As shown in FIG. 1, the call setup system of the present invention includes an outbound VoIP terminal 10, an outbound proxy server, or call manager, 20 and an inbound VoIP terminal 30.

When a user inputs an ID for a destination terminal, which the user want to call, through a user interface, the outbound VoIP terminal 10 identifies whether or not an index matching the user-input ID exists in an already-stored Destination Address Translation Table (DATT).

If the index matching the user-input ID exists in the DATT, the outbound VoIP terminal 10 directly transmits a call initiation message to the destination terminal, so that advanced call procedures can be carried out.

In this case, when call setup is established, the outbound VoIP terminal 10 transmits a notify message to the call manager 20, so that state synchronization can be enabled.

That is, if the outbound VoIP terminal 10 establishes call setup on the basis of a local address translation table, which is constructed at the time of call setup, the call manager 200 cannot identify the call state of the corresponding terminal.

Therefore, in the case of a call manager or a VoIP terminal using SIP (Session Initiation Protocol) standard protocol, the outbound VoIP terminal 10 notifies related information using a notification method at the time of call setup.

However, if the call manager 20 is stateless, that is, does not conduct terminal state management, the outbound VoIP terminal 10 needs to interwork with a user state management server.

If the index matching with the user-input ID does not exist in the DATT, the outbound VoIP terminal 10 transmits a call initiation message to the call manager 20.

In this case, when call setup is established, the outbound VoIP terminal 10 adds a related index to a local address translation table, so that normal call procedures can be carried out.

That is, in the case of call setup, if the matching index of the destination terminal does not exist, the outbound VoIP terminal 10 adds related information, as a new index, to the local address translation table, in which a temporal address translation table is dynamically stored in a local terminal. An exemplary structure of the temporal address translation table is reported in Table 1 below:

TABLE 1

| ID (TEL No.) | IP Address | Port | Aging Time | Type |
|---|---|---|---|---|
| 070-750-4885 | 192.168.110.101 | 5060 | 3600 msec | Dynamic |
| 070-775-8364 | 192.168.110.110 | 5060 | 1350 msec | Dynamic |
| 070-722-2965 | 192.168.110.115 | 5060 | 120 msec | Dynamic |

In the meantime, when the counterpart terminal generates an inbound call, the outbound VoIP terminal 10 identifies whether or not an index matching a caller ID exists in the DATT. If the index matching the caller ID does not exist, the outbound VoIP terminal 10 carries out normal call procedures.

However, if the index matching the caller ID exists in the DATT, the outbound VoIP terminal 10 updates aging time for this index and carries out advanced call procedures.

That is, the outbound VoIP terminal 10 performs table update on the basis of aging time. In particular, in the case where a call setup request is made from a terminal corresponding to the matching index, which is stored in the local area translation table, if there is no change in ID and IP information, the temporal address translation table is updated by updating the aging time of a related index.

However, if there is a change in ID and IP information, the related index is deleted, and a new table is formed in the next outbound call attempt.

The call manager 20 basically manages the user state of respective VoIP terminals.

In particular, in the case where the outbound VoIP terminal 10 directly transmits a call initiation message to a destination terminal, the call manager 20 cannot know the call state of the destination terminal at the time of call setup. Hence, the call manager 20 receives a notify message from the outbound VoIP terminal 10 to carry out state synchronization.

The inbound VoIP terminal 30 establishes a call setup directly with the outbound VoIP terminal 10 or through the call manager 20, and carries out the same functions for both outbound and inbound signals as the outbound VoIP terminal 10.

Figure 2:
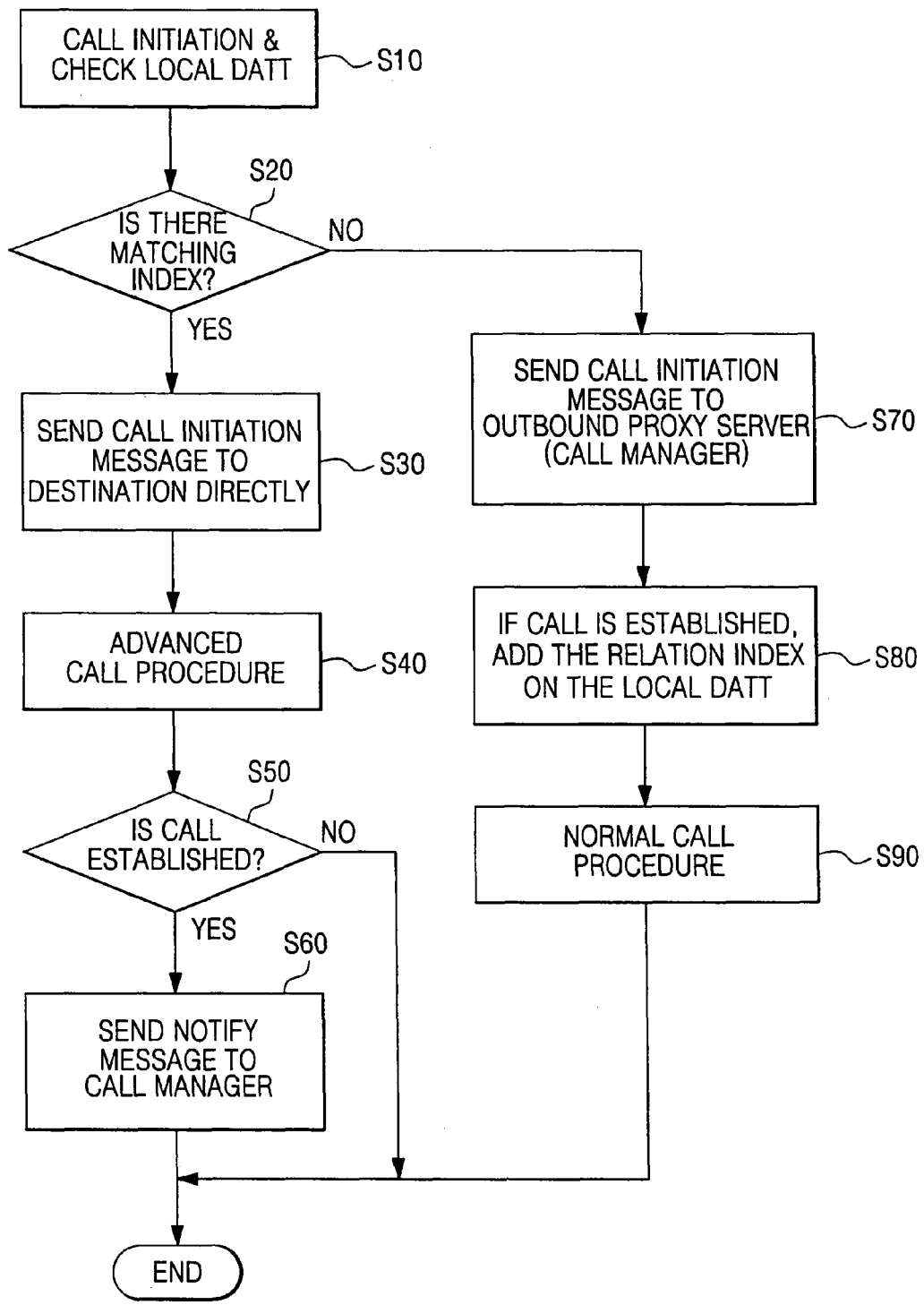
FIG. 2 is a flowchart illustrating a process of processing an outbound call according to the present invention.

FIG. 2 is a flowchart illustrating a process of processing an outbound call according to the present invention.

As shown in FIG. 2, when a user inputs an ID for an inbound terminal (also known as a destination terminal), which he/she wants to call, an outbound terminal (also known as a source terminal) starts call initiation and checks a DATT in S10.

In S20, the outbound terminal identifies whether or not an index matching the user-input ID exists in the DATT.

If it is identified that the index matching the user-input ID exists in the DATT, the outbound terminal directly transmits a call initiation message to the destination terminal in S30.

Subsequently, advanced call procedures are carried out in S40, call setup is identified in S50, and if call setup is established, a notify message is transmitted to a call manager in S60.

If it is identified, in the procedure S20, that the index matching the user-input ID does not exist in the DATT, the outbound terminal transmits a call initiation message to the call manager in S70.

Subsequently, when call setup is established with the destination terminal, a related index is added to a local address translation table in S80, and normal call procedures are carried out in S90.

According to the present invention, when a counter part telephone number is inputted, a VoIP terminal does not always transmit a call setup message directly to the call manager. The VoIP terminal first checks the information of a temporal address translation table stored in the local address translation table, and if there is no mapping information, then the call setup message is transmitted through the call manager to the destination terminal.

Through these procedures, a matching table is constructed, based upon the counterpart telephone number and final contact information, in the temporal address translation table of the VoIP terminal.

After this, a next call setup for the telephone number of the same destination is established based upon matching information of the local address translation table. In this case, the temporal address translation table is refreshed by the application of aging time. This is because of the variability of data networks, that is, most terminals use an IP address using Dynamic Host Configuration Protocol (DHCP).

Figure 3:
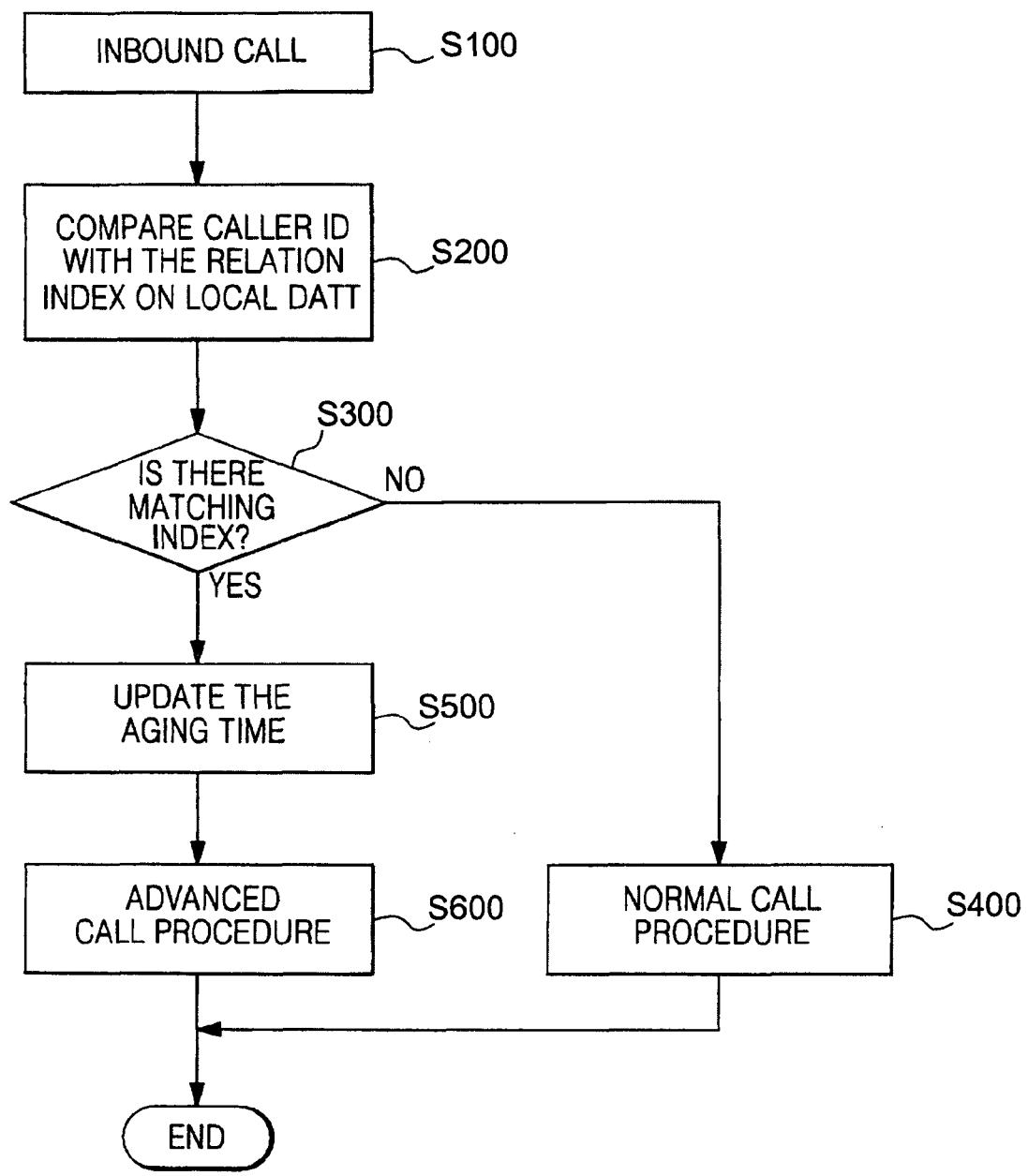
FIG. 3 is a flowchart illustrating a process of processing an inbound call according to the present invention.

FIG. 3 is a flowchart illustrating a process of processing an inbound call according to the present invention.

As shown in FIG. 3, when the counterpart terminal generates an inbound call in S100, the outbound terminal compares a caller ID and a related index in a local address translation table (DATT) in S200.

In S300, it is identified whether or not an index matching the caller ID exists in the related index of the DATT.

If it is identified that the index matching the caller ID does not exist in the DATT, the outbound terminal carries out normal call procedures in S400.

However, if it is identified that the index matching the caller ID exists in the DATT, the outbound terminal updates aging time for the corresponding index in S500, and carries out advanced call procedures in S600. Here, the aging time update indicates that the aging time is set to be maximum (MAX).

According to the present invention as set forth above, the VoIP terminal constructs an address translation table on the basis of related ID and IP address information, and establishes call setup by caching for a translated IP address, thereby shortening call setup time and reducing the load of the call manager.

While the present invention has been shown and described in connection with the preferred embodiments, it will be apparent to those skilled in the art that modifications and variations can be made without departing from the spirit and scope of the present invention as defined by the appended claims.

What is claimed is:

1. A call setup method in an Internet protocol network, comprising:
   receiving, at a first terminal, a request for an outbound call associated with an identification of a second terminal;
   identifying, at the first terminal in response to receiving the request, whether an index matching the identification of the second terminal exists in a matching table;
   if the index matching the identification of the second terminal exists in the matching table, updating an aging time of the matching table and directly transmitting, by the first terminal, a call initialization message to the second terminal; and
   transmitting, by the first terminal in response to call setup, a call state synchronization message to a call manager,
   wherein the matching table is refreshed upon expiration of the aging time.

2. The call setup method according to claim 1, further comprising:
   if the index matching the identification of the second terminal does not exist in the matching table, transmitting, by the first terminal, the call initialization message to the call manager;
   adding, in response to call setup, a related index to the matching table; and
   processing the requested outbound call.

3. The call setup method according to claim 2, wherein the related index added to the matching table includes counterpart identification information and final contact information.

4. The call setup method according to claim 3, wherein the counterpart identification information and the final contact information are associated with the second terminal.

5. The call setup method according to claim 1, wherein the call state synchronization message is transmitted to the call manager using a notify method.

6. The call setup method according to claim 1, wherein the call state synchronization message is transmitted to the call manager to initiate call state synchronization with the call manager.

7. The call setup method according to claim 1, wherein the matching table is local to the first terminal.

8. A call setup method in an Internet Protocol network, comprising:
   identifying, in response to a request from a first terminal for an inbound call of a second terminal, whether an index matching an input identification exists in a matching table;
   if the index matching the identification of the second terminal exists in the matching table, updating an aging time of the matching table; and
   after the aging time is updated, processing the requested inbound call,
   wherein the matching table is refreshed upon expiration of the aging time.

9. The call setup method according to claim 8, further comprising:
   if it is identified, in the identifying step, that there is a change in an Internet protocol mapping to the identification of the second terminal, deleting a related index from the matching table.

10. The call setup method according to claim 8, wherein the identifying, the updating, and the processing occur at the first terminal.

11. The call setup method according to claim 8, wherein the matching table is local to the first terminal.

12. The call setup method according to claim 8, wherein the aging time is associated with the index matching the identification of the second terminal.

13. A call setup terminal in an Internet protocol network, comprising:
   a controller configured to:
     receive a request for an outbound call associated with an identification of a destination terminal, and
     determine whether an index matching the identification of the destination terminal exists in a matching table,
   wherein if the index matching the identification of the destination terminal exists in the matching table, the controller is further configured to:
     cause, at least in part, a call initialization message to be directly transmitted to the destination terminal,
     cause, at least in part, a call state synchronization message to be transmitted to a call manager in response to call setup, and
     update an aging time of the matching table, and wherein the matching table is refreshed upon expiration of the aging time.

14. The call setup terminal according to claim 13, wherein if the index matching the identification of the destination terminal does not exist in the matching table, the controller is further configured to:
    cause, at least in part, the call initialization message to be transmitted to the call manager; and
    add a related index to the matching table in response to call setup.

15. The call setup terminal according to claim 14, wherein the related index added to the matching table comprises counterpart identification information and final contact information.

16. The call setup terminal according to claim 15, wherein the counterpart identification information and the final contact information are associated with the destination terminal.

17. The call setup terminal according to claim 13, wherein the controller is further configured to:
    cause, at least in part, the call state synchronization message to be transmitted to the call manager using a notify method.

18. The call setup terminal according to claim 13, wherein the controller is further configured to:
    delete, if there is a change in an Internet protocol mapping to the identification of the destination terminal, a related index from the matching table.

19. The call setup terminal according to claim 13, wherein the call state synchronization message is caused, at least in part, to be transmitted to the call manager to initiate call state synchronization with the call manager.

20. The call setup terminal according to claim 13, wherein the matching table is local to the call setup terminal.

* * * * *